(12) United States Patent
Chuo

(10) Patent No.: US 7,001,072 B2
(45) Date of Patent: Feb. 21, 2006

(54) LINEAR GUIDEWAY WITH DAMPING MEANS

(75) Inventor: Yung-Tsai Chuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 127 days.

(21) Appl. No.: 10/353,999

(22) Filed: Jan. 30, 2003

(65) Prior Publication Data

US 2004/0151408 A1    Aug. 5, 2004

(51) Int. Cl.
    *F16C 29/06*    (2006.01)
(52) U.S. Cl. .......................... 384/43; 384/45
(58) Field of Classification Search .................. 384/40, 384/43, 45, 48, 49
    See application file for complete search history.

(56) References Cited

U.S. PATENT DOCUMENTS

| | | | | |
|---|---|---|---|---|
| 4,417,771 A | * | 11/1983 | Teramachi | 384/45 |
| 4,662,762 A | * | 5/1987 | Schwarz | 384/25 |
| 4,773,770 A | * | 9/1988 | Osawa et al. | 384/45 |
| 5,181,780 A | * | 1/1993 | Morita | 384/8 |
| 5,268,970 A | * | 12/1993 | Tanaka | 384/43 |
| 5,273,364 A | * | 12/1993 | Hara | 384/8 |
| 5,273,367 A | * | 12/1993 | Tanaka | 384/45 |
| 5,694,811 A | * | 12/1997 | Tsukada | 74/467 |
| 6,179,468 B1 | * | 1/2001 | Thorstens et al. | 384/40 |

\* cited by examiner

*Primary Examiner*—William C Joyce
(74) *Attorney, Agent, or Firm*—Rosenberg, Klein & Lee

(57) ABSTRACT

A linear guideway with damping is provided mainly comprising a guide rail and a slider module, said slider module comprising a slider body, a plurality of roller balls, caps for roller balls to circulate and a damping block. The slider module is provided with said damping block inside to damp said linear guideway without adding extra components to reduce vibration. Furthermore, a Damping adjustment device is provided to adjust a damping effect formed by contacting said damping block with said slider body and said guide rail in order to provide optimal vibration absorption.

3 Claims, 3 Drawing Sheets

LINEAR GUIDEWAY WITH DAMPING MEANS

BACKGROUND OF THE INVENTION

1. Field of the Invention

The present invention is related to a linear guideway with damping means, and more particularly, to a linear guiding mechanism for guiding linear movement for mechanisms such as machinery, electronics, automation and semiconductor equipment.

2. Description of the Prior Art

In the highly developed world where industrial automation is emphasized, problems caused by mechanical vibrations are existed in every industry. The precision of machinery in processing, the surface roughness of the working parts and the lifetime of components are all related to mechanical vibrations. Therefore, it has become an important objective to reduce vibrations in mechanical systems.

Linear guiding mechanisms are commonly applied to many kinds of machinery and equipment, linear guide is one of them, please refer to FIG. 6 for the traditional vibration absorption design of linear guide. A guide rail 10 of linear guide is installed on the working base with two slider modules 20 and a damping slider 30 supported on guide rail 10, wherein the damping slider 30 is placed between the two slider modules 20; the slider modules 20 having roller balls 22 placed in the grooves between a slider body 21 and the guide rail 10 for rolling, then the linear guide can move linearly. The damping slider 30 comprising a shell 31 and dampers 32, wherein the shell can be fixed to the working base, and the two dampers 32 are in contact with the lateral side of the guide rail 10 to absorb vibration. In general, the working part is fixed to the working base, while the working base is fixed to the slider module 20 and the damping slider 30 to move linearly. When there's vibration from the equipment arriving at the guide rail 10, the dampers 32 on both sides of the damping slider 30 on the guide rail 10 absorb the vibration to provide damping effect.

Since the traditional linear guide uses at least one damping sliders to absorb vibration, the extra damping slider parts will increase cost; besides, extra parts need certain space, which decreases the stroke or introduces extra length to the guide rail, presenting big limitations to the implementation of micro mechanical or precision mechanical systems, therefore, further improvement is desired.

SUMMARY OF THE INVENTION

It is an object of the present invention to provide a linear guideway with damping means, which damps the linear guide without adding extra parts to the linear guide.

It is another object of the present invention to provide a linear guideway with damping means, users can adjust the damping effect formed by contacting the damper with the slider body and the guide rail to provide best vibration absorption.

There are various ways to reduce vibration, among them, adding a vibration absorption device to the mechanical system is a simple way to reduce vibration effectively. Generally speaking, linear guide used in mechanical system mainly comprises a linear guide with a slider module supported thereon. If we add a vibration absorption device to the slider module of the linear guide, though reducing vibration in a simple way, the drawback of prior art techniques will be inevitable, presenting limitations to the implementation of micro mechanical systems.

Therefore, the present invention provides a linear guideway with damping means, wherein the add-on vibration absorption device is included as a component in the slider module. The guide rail is in bar shape, having grooves on both sides thereof, the slider module comprising the slider body, the roller balls, caps and damping device, wherein the slider body is supported on the guide rail and moves along the guide rail, and the slider body having grooves operating in coordination with the grooves of the guide rail, with roller balls placed in the grooves between the guide rail and the slider body for rolling, caps being disposed on both ends of the slider body for roller balls to turn back and circulate.

The present invention provides a damper disposed in the narrow space between the slider body and the guide rail without altering the current slider module design. Based on technical considerations and the objective to save space, the present invention adopts passive vibration absorption system, which basically comprises an add-on passive component, such as spring or damper, attached to the mechanical system to absorb the vibration caused by the mechanical system. Moreover, in considering the cost and the simplicity of the design, the present invention adopts damper having vibration absorption material filled in the narrow space between the slider body and the guide rail, since the slider body and the guide rail both having grooves on the lateral sides for roller balls to roll, there will be less damping material on the lateral sides in this invention. Due to the omnidirectional effect of the damper, the damping material filled in the narrow space between the slider body and the guide rail can provide lateral damping effect as well. Therefore, the present invention can provide damping effect without adding extra parts to the linear guide.

Furthermore, a damping adjustment device can be disposed on top of the damping material to adjust the damping effect formed by contacting said damping material with the slider body and the guide rail to provide best vibration absorption. Please refer to the following preferred embodiment to further understand the characteristics and techniques of the present invention, however, the exemplified embodiment and the accompanying drawings are only to describe the present invention, not to limit the scope the present invention in any manner.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
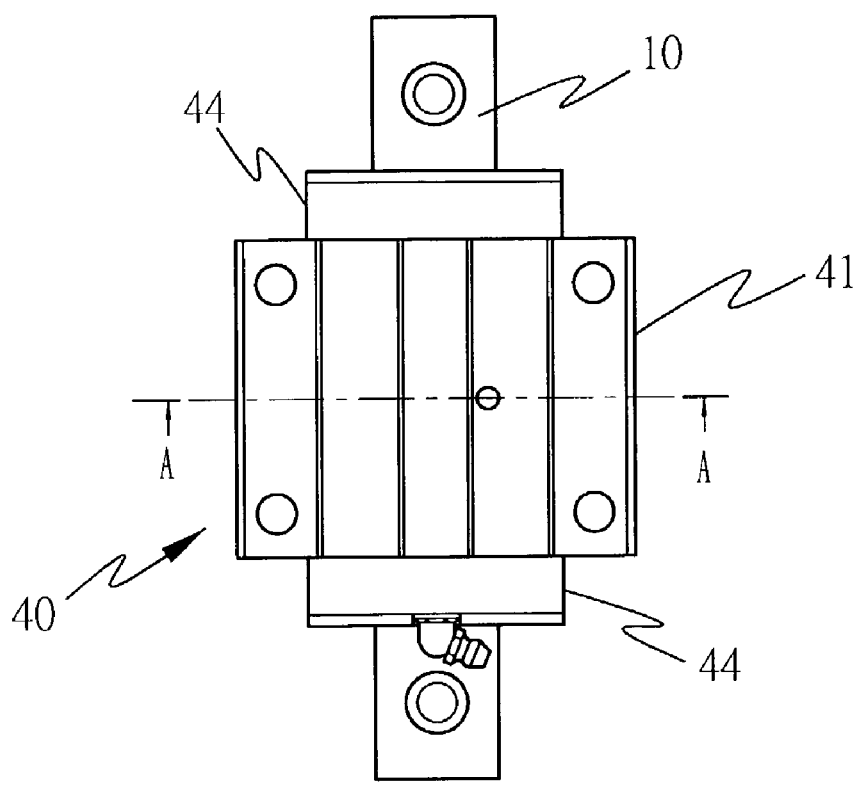
FIG. 1 shows a vertical view of an embodiment of the linear guide with damper in the present invention.
Figure 2:
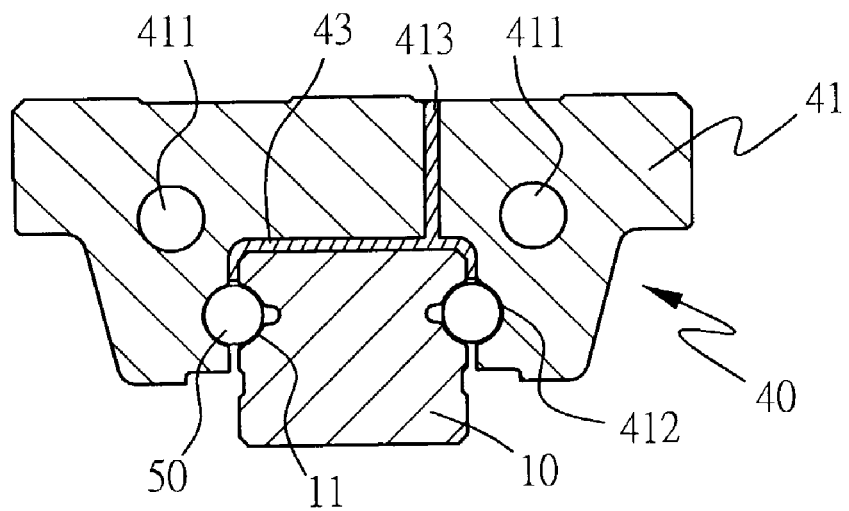
FIG. 2 shows a A—A cross-sectional view of FIG. 1.

FIG. 1 shows a vertical view of a first embodiment of the linear guide with damper in the present invention, wherein the linear guide comprising a guide rail 10 and a slider module 40 supported on the guide rail 10; the slider module 40 mainly comprising a slider body 41, roller balls (as shown in FIG. 2), caps 44 for roller balls to turn back and circulate and a damping block (as shown in FIG. 2). FIG. 2 shows a A—A cross-sectional view of FIG. 1, wherein the guide rail 10 is in bar shape, having grooves 11 on both lateral sides thereof; the slider body 41 having grooves 412 operating in coordination with the grooves 11 of the guide rail 10, with roller balls 50 placed in the grooves 11 and 412 for rolling, caps 44 being disposed on both ends of the slider body 41 for roller balls 50 to turn back into the circulating hole 411 and circulate, hence the slider module 40 can carry load and move along the guide rail 10 linearly. A filler hole 413 disposed on said slider body 41 for filling damping material to form a damping block 43, so the damping block 43 is disposed in the narrow space among the two caps 44, the slider body 41 and the guide rail 10, making it easily and conveniently for linear guide to provide damping effect without adding extra parts. Preferably, concave slots are carved out inside the slider body 41 to hold the damping block 43 firmly within the slider body 41.

Figure 3:
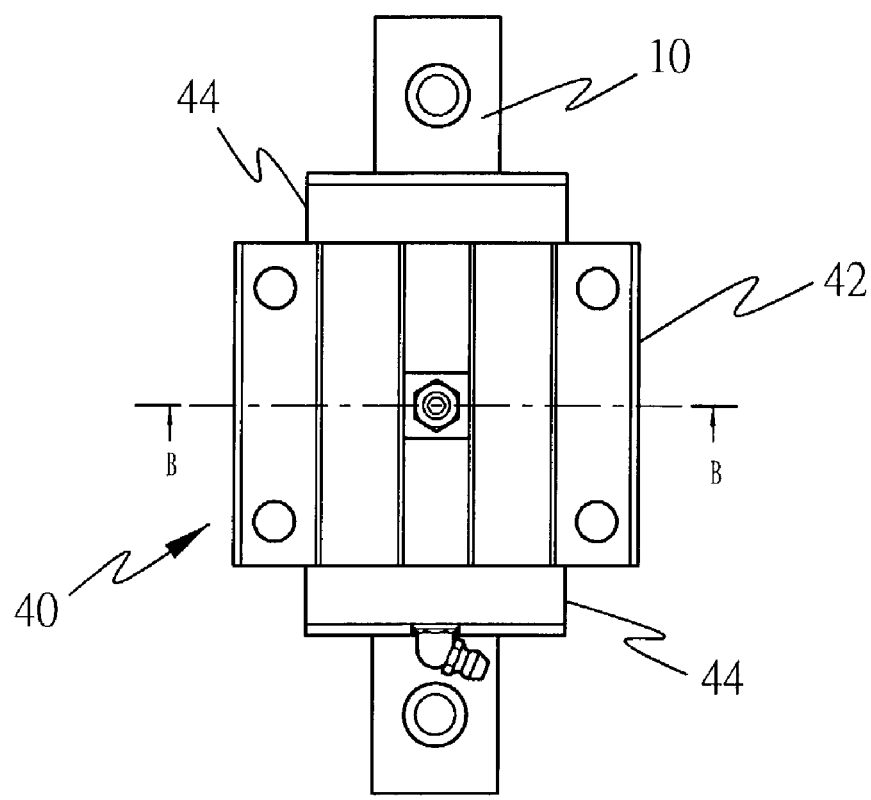
FIG. 3 shows a vertical view of another embodiment of the linear guide with damper in the present invention.
Figure 4:
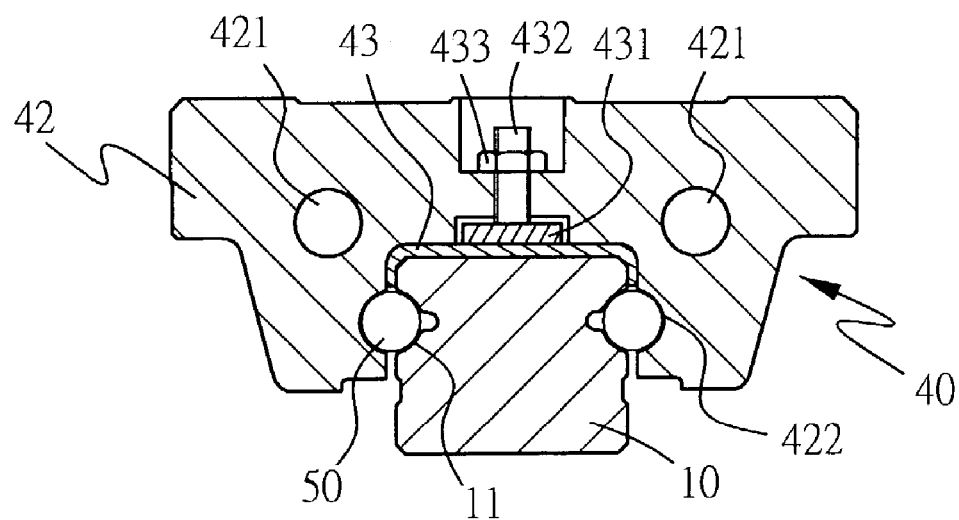
FIG. 4 shows a B—B cross-sectional view of FIG. 3.
Figure 5:
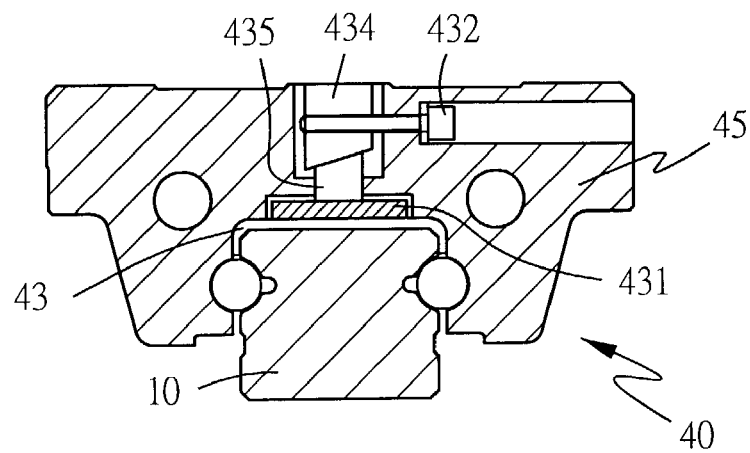
FIG. 5 shows a lateral cross-sectional view of a third embodiment of the linear guide with damper in the present invention.
Figure 6:
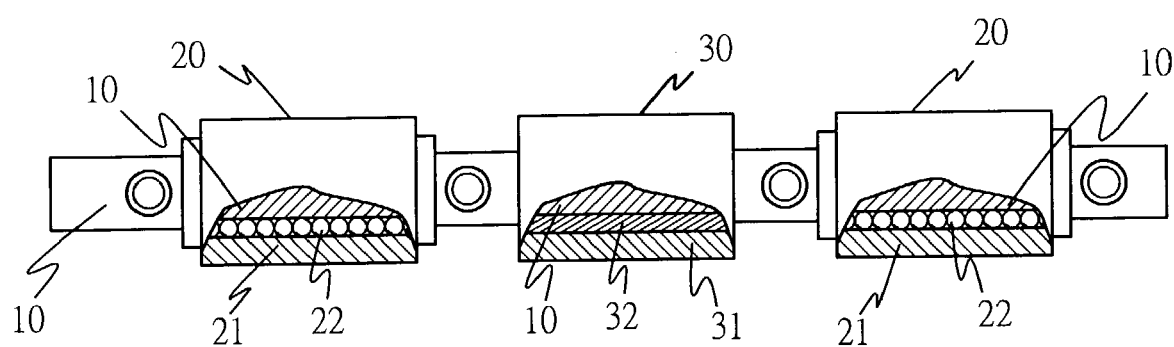
FIG. 6 shows the diagram of a traditional linear guide having damping effect.

FIG. 3 shows a vertical view of another embodiment of the linear guide with damper in the present invention. FIG. 4 shows a B—B cross-sectional view of FIG. 3. This embodiment is based on the first embodiment, with a damping adjustment device added additionally, wherein a slider module 40 is supported on the guide rail 10, and the slider module 40 mainly comprising a slider body 42, roller balls 50, caps 44 for roller balls to turn back and circulate, a damping block 43 and the damping adjustment device. Same with the first embodiment, roller balls 50 are placed in the groove 11 of the guide rail 10 and the groove 422 of the slider body 42 for rolling, with the caps 44 disposed on both ends of the slider body 42 for roller balls 50 to turn back into the circulating hole 421 and circulate; wherein the damping block 43 is disposed in the narrow space between the slider body 42 and the guide rail 10 as well. What is different from the first embodiment is that, a damping adjustment device is disposed on top of the damping block 43. The damping adjustment device comprises a damping adjustment block 431, a screw 432 and the nut 433, wherein the damping adjustment block is preferably made of material with high strength, such as metal, to provide better adjustment. When user needs to adjust the damper, first adjust the screw 432 to an appropriate position, letting the damping adjustment block 431 to provide proper force to the damping block 43, then the nut 433 is used for fixing the position of the screw 432. Therefore, a better effect of vibration absorption is achieved by contacting the damping block 43 with the slider body 42 and the guide rail 10. Furthermore, FIG. 5 shows a lateral cross-sectional view of a third embodiment of the linear guide with damper in the present invention. In this embodiment, the adjustment of the damping adjustment device is implemented on a lateral side of the slider body 45, wherein a screw 432 is disposed on a lateral side of the slider body 45, with an upper wedge portion 434 fixed to the screw 432, and the upper wedge portion 434 joining to a lower wedge portion 435. When user turns the screw 432, the upper wedge portion 434 and the lower wedge portion 435 moving in coordination to exert a force on the damping adjustment block 431, then the damping adjustment block 431 can provide proper force to the damping block 43. Therefore, a better effect of vibration absorption is achieved by contacting the damping block 43 with the slider body 42 and the guide rail 10.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A linear guideway with damping means, comprising:
   a guide rail in bar shape having a first groove and a second groove separated from each other and formed on each side of said guide rail;
   a slider body slidably supported said guide rail having a third groove and a fourth groove separated from each other and formed on each side of said slider body to operate in coordination with said first groove and said second groove of said guide rail;
   a plurality of roller balls placed in said first groove and said second groove of said guide rail and said third and said fourth groove of said slider body for rolling;
   two caps disposed on both ends of said slider body for said plurality of roller balls to turn back and circulate;
   a damping block disposed within said slider body to fill in a narrow space between said slider body and said guide rail to maintain or contact therewith; said damping block defining a substantially U-shaped sectional contour extending in conformed manner over said guide rail between said first and second grooves thereof, whereby vibrations in both vertical and horizontal directions relative to said guide rail are concurrently dampened; and
   a damping adjustment device being disposed on said damping block for adjustable displacement thereof, said damping adjustment device including a screw, an upper wedge portion, a lower wedge portion and a damping adjustment block for a user to adjust damping from a lateral side of said slider body.

2. The linear guideway with damping means as recited in claim 1, wherein said damping adjustment block is made of metal to provide rigidness.

3. The linear guideway with damping means as recited in claim 1, wherein said damping adjustment block is made of metal to provide rigidness.

* * * * *